United States Patent [19]

Kimura

[11] Patent Number: 4,546,391
[45] Date of Patent: Oct. 8, 1985

[54] VIDEO SIGNAL RECORDING APPARATUS

[75] Inventor: Kenji Kimura, Tokyo, Japan

[73] Assignee: Olympus Optical Co., Ltd., Tokyo, Japan

[21] Appl. No.: 462,888

[22] Filed: Feb. 1, 1983

[30] Foreign Application Priority Data

Feb. 4, 1982 [JP] Japan .................................. 57-16645
Feb. 4, 1982 [JP] Japan .................................. 57-16646

[51] Int. Cl.⁴ .............................................. H04N 5/78
[52] U.S. Cl. .................................. 360/19.1; 360/10.1;
360/35.1; 358/341
[58] Field of Search ........................ 358/335, 341–343,
358/906; 360/19.1, 10.1, 35.1

[56] References Cited

U.S. PATENT DOCUMENTS 3,878,560 4/1975 Ramage .......................... 360/19.1 X
4,450,488 5/1984 Golding ............................... 358/342

FOREIGN PATENT DOCUMENTS

56-782 4/1980 Japan .................................. 360/19.1

Primary Examiner—Robert L. Richardson
Attorney, Agent, or Firm—Frishauf, Holtz, Goodman & Woodward

[57] ABSTRACT

A video signal recording apparatus has a motor for rotating a magnetic disc at low or high speed, a recording/playback head for recording audio signals on a single first track while the magnetic disc is rotated at the low speed, and a recording head for recording audio signals reproduced from the first track and video signals of one frame. The audio signals are time-base compressed and are reproduced while the magnetic disc is rotated at the high speed. The audio signals are superposed on the video signals to produce a composite signal, thereby recording the composite signal on a single second track.

6 Claims, 10 Drawing Figures

VIDEO SIGNAL RECORDING APPARATUS

BACKGROUND OF THE INVENTION

The present invention relates to a video signal recording apparatus and, more particularly, to a video signal recording apparatus for recording a still image.

Recently, video signal recording apparatuses called electronic cameras, have been developed which use a magnetic disc in place of a silver chloride film. The electronic camera has the same outer appearance as a conventional camera, but has a structure in which a solid-state image pickup element such as a CCD is disposed on the film surface and one-frame television signals from the image pickup element are recorded on a track on the magnetic disc inside the camera.

A reproduction section is also provided which is connected to output equipment such as a printer or a CRT. The reproduction frame signal from the magnetic disc is supplied to the printer or the CRT so as to obtain hard copy or soft copy of the video image. In the recording mode, only the electronic camera is required, so that picture taking can be performed in the same manner as in the conventional method.

Demands also arise in which the user wishes to record audio signals such as comments indicating a photographing date and a photographing location. Since a one-frame time period is 1/30 sec in the standard television system, time base compression of the audio signal must be performed in order to record the audio signal together with a one-frame image. Furthermore, since the audio signal has a frequency band lower than that of the video signal and the sound quality of the reproduced audio signal is not so important, time base compression of the audio signal is preferably performed, and the compressed audio signal is recorded together with the video signal.

In general, time base compression of the audio signal can be performed by changing the writing and reading speeds of the audio signals using a semiconductor memory. More particularly, the audio signal is written in the semiconductor memory before the video signal is recorded. The audio signal is then read out from the memory simultaneously (within 1/30 second) when the video signal is recorded. At the same time, the audio signal is recorded together with the video signal on the magnetic disc.

However, in the conventional time base compression method as described above, a semiconductor memory of large capacity must be built into the camera to record audio signals which last for only a few seconds. For this reason, manufacturing cost, weight and power consumption of the camera are increased, resulting in inconvenience.

SUMMARY OF THE INVENTION

It is, therefore, an object of the present invention to provide a video signal recording apparatus in which time base compression of the audio signal is performed without using a special memory to record the compressed audio signal together with a video signal of a still image on a disc-shaped recording medium.

In order to achieve the above object of the present invention, there is provided a video signal recording apparatus using a disc-shaped recording medium which has a plurality of concentric recording tracks, comprising: a rotating mechanism for rotating the recording medium at a first speed and a second speed, the latter being faster than the first speed; a first recording circuit for recording an audio signal on the first track while the recording medium is rotated at the first speed; and a second recording circuit for reproducing the audio signal from the first track and for recording a reproduced audio signal and a video signal of a still image on any track other than the first track while the recording medium is rotated at the second speed.

DETAILED DESCRIPTION OF THE PREFERRED EMBODIMENTS

Figure 1:
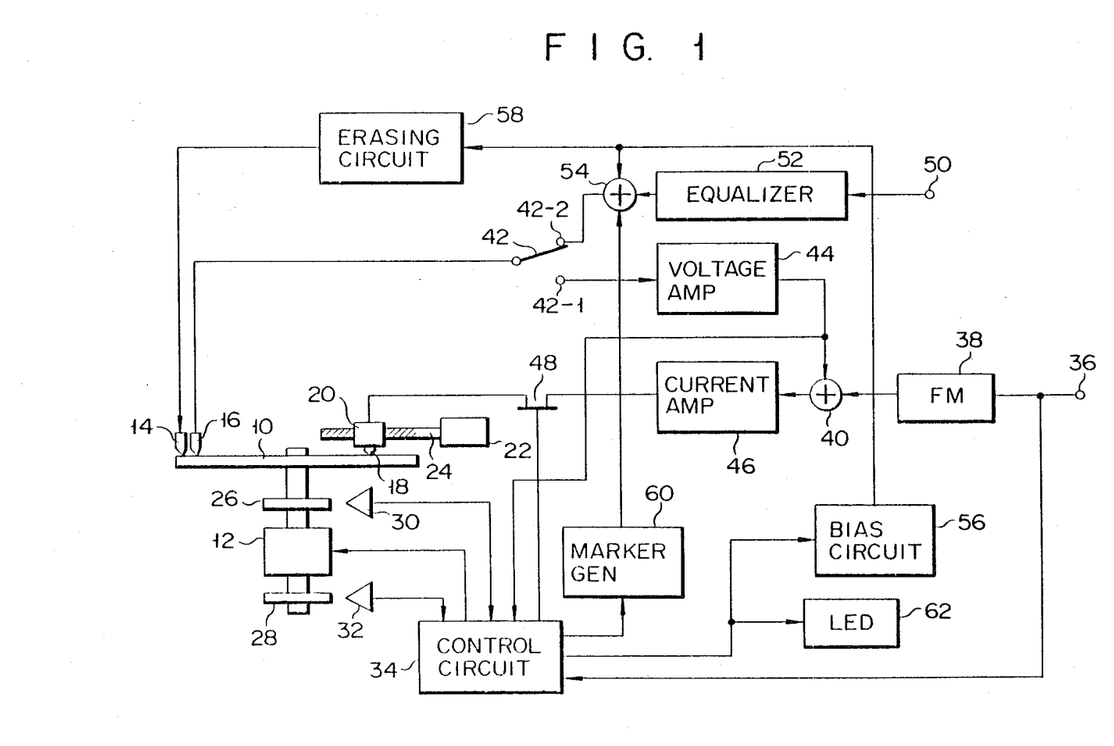
FIG. 1 is a block diagram of a video signal recording apparatus according to a first embodiment of the present invention.
Figure 2:
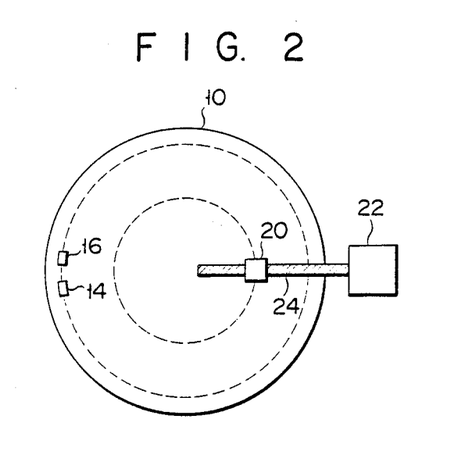
FIG. 2 is a plan view for explaining the positional relationship between a disc and magnetic heads.

FIG. 1 is a block diagram of the video signal recording apparatus of a first embodiment. A magnetic disc 10 as a recording medium is coaxially placed on a turntable (not shown). The rotating shaft of the turntable is driven by a DC motor 12. An erasing head 14, an audio signal recording/playback head 16, and a video/audio signal recording head 18 are disposed on the recording surface of the magnetic disc 10. A plurality of recording tracks are concentrically formed on the magnetic disc 10 upon rotation of the DC motor 12. The erasing head 14 and the audio signal recording/playback head 16 are fixed to scan the outermost track. The head 18 is arranged to be radially movable on the magnetic disc 10 by a moving mechanism. The head 18 is mounted on a holder 20 which can be radially moved along a guide rail (not shown). The holder 20 is screwed around a feed screw 24 rotated by a stepping motor 22. The holder 20 and hence the recording head 18 are radially moved on the magnetic disc 10. The positional relationships among the magnetic disc 10, the erasing head 14, the recording/playback head 16 and the video/audio signal recording head 18 are shown in the plan view in FIG. 2. The head 14 is disposed in front of the head 16 along the rotational direction of the magnetic disc 10.

A rotational speed detection encoder 26 and a rotational phase detection encoder 28 are mounted on the rotating shaft of the DC motor 12. A speed sensor 30 and a phase sensor 32 are disposed in the vicinities of the encoders 26 and 28, respectively. The encoder 26 generates moiré fringes the gap of which corresponds to the rotational speed of the rotating shaft of the DC motor 12. The sensor 30 detects the gap between the moiré fringes and produces a signal which has a frequency corresponding to the speed. The encoder 26 comprises a disc having a magnet on a part thereof. The sensor 32 detects the rotation of the magnet and produces a pulse each time it detects the magnet. The output signals from the sensors 30 and 32 are supplied to a control circuit 34 (to be described in detail later) which controls motor rotation and recording timing.

A television signal input end 36 connected to an image pickup section (not shown) is connected to a frequency modulator 38 and the control circuit 34. An output signal from the frequency modulator 38 is supplied to the first input end of a mixer 40. The audio signal recording/playback head 16 is connected to the movable contact of a switch 42. A first stationary contact 42-1 of the switch 42 is connected to the second input end of the mixer 40 through a voltage amplifier 44. An output signal from the voltage amplifier 44 is also supplied to the control circuit 34. The output signal from the mixer 40 is supplied to the head 18 through a current amplifier 46 and an analog switch 48. The analog switch 48 can be turned on by the control circuit 34.

An audio signal input end 50 connected to a microphone (not shown) is connected to the first input end of a mixer 54 through an equalizer 52. An output signal from a bias circuit 56 turned on in response to an output from the control circuit 34 is supplied to the second input end of the mixer 54 and to an erasing circuit 58. An output from the erasing circuit 58 is supplied to the head 14. An output from a marker generator 60 turned on in response to an output from the control circuit 34 is supplied to the third input end of the mixer 54. The output end of the mixer 54 is connected to a second stationary contact 42-2 of the switch 42. An LED 62 is connected to the control circuit 34 and is turned on/off simultaneously when the bias circuit 56 is turned on/off.

Figure 3:
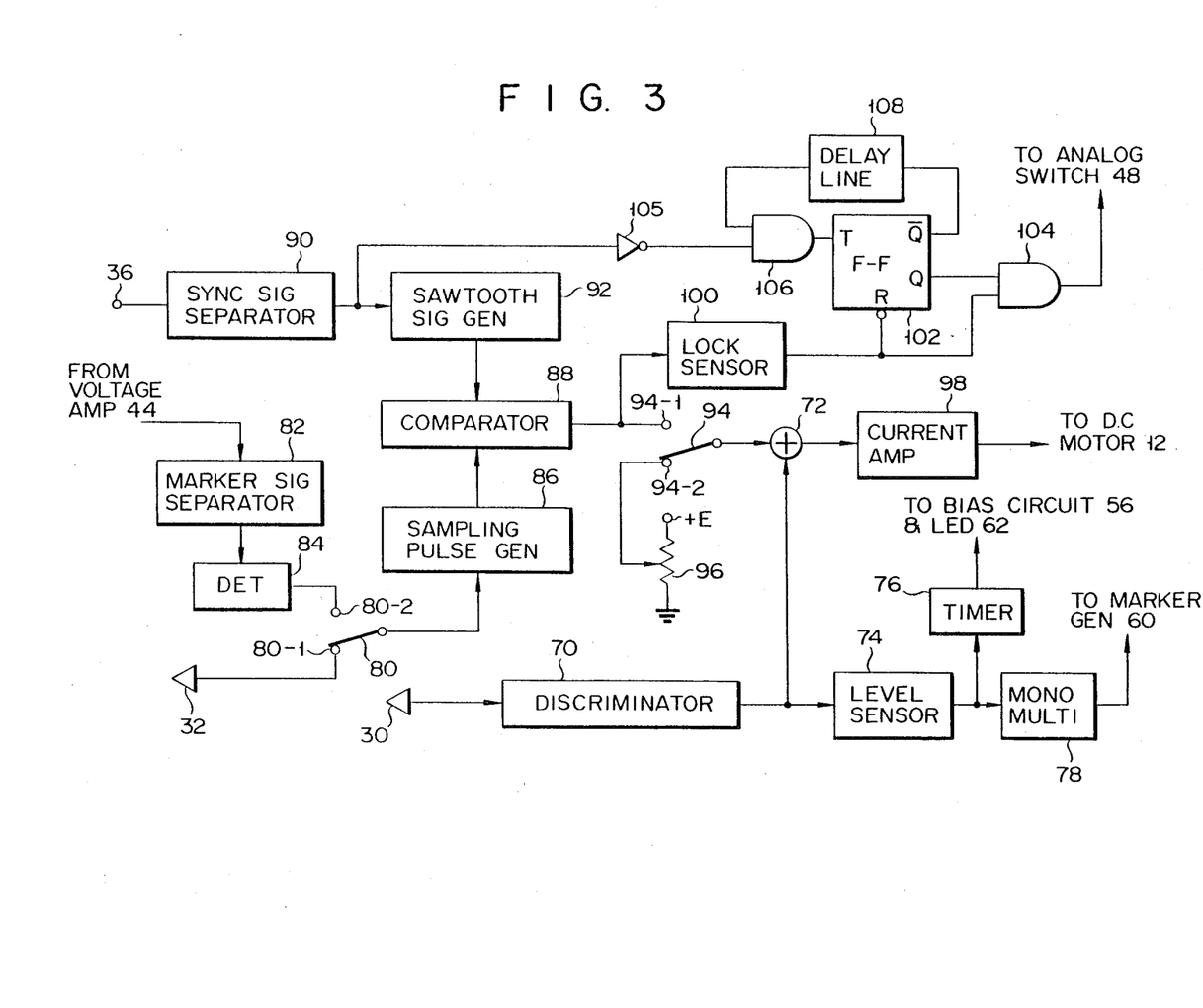
FIG. 3 is a detailed block diagram of a control circuit of the video signal recording apparatus shown in FIG. 1.

The detailed arrangement of the control circuit 34 for controlling motor rotation and recording timing will be described with reference to FIG. 3. The sensor 30 is connected to a discriminator 70. The discriminator 70 converts a signal having a frequency corresponding to the rotational speed of the motor to a signal having a voltage corresponding to the rotational speed. The motor 12 is rotated at the first predetermined angular velocity when only an audio signal is recorded. However, the motor 12 is rotated at the second predetermined angular velocity which is higher than the first predetermined angular velocity when audio and video (television) signals are simultaneously recorded. This motor operation will be described in detail later. When the motor 12 is rotated at the second predetermined angular velocity, the discriminator 70 produces a voltage of 0 V. However, when the motor 12 is rotated at the first predetermined angular velocity, the discriminator 70 produces a negative voltage. This output signal from the discriminator 70 is supplied to the first input end of a mixer 72 and to a level sensor 74. The level sensor 74 senses a negative voltage corresponding to the first predetermined angular velocity. The output signal from the level sensor 74 is supplied to a timer 76 and a monostable multivibrator 78. The timer 76 causes the bias circuit 56 and the LED 62 to turn on for five seconds in response to the output from the level sensor 74. The monostable multivibrator 78 supplies a 1-ms pulse to a marker generator 60 in response to the output from the level sensor 74.

The phase sensor 32 is connected to a first stationary contact 80-1 of a switch 80. The voltage amplifier 44 receives the reproduced audio signal and produces an output signal which is then supplied to a second stationary contact 80-2 of the switch 80 through a marker separator 82 and a detector 84. The movable contact of the switch 80 is connected to the first input end of a comparator 88 through a sampling pulse generator 86. The television signal input end 36 is connected to the second input end of the comparator 88 through a synchronous signal separator 90 and a sawtooth signal generator 92. The output end of the comparator 88 is connected to a first stationary contact 94-1 of a switch 94. A potentiometer 96 is connected to a second stationary contact 94-2 of the switch 94. The movable contact of the switch 94 is connected to the second input end of the mixer 72. The output signal from the mixer 72 is supplied to the DC motor 12 through a current amplifier 98. The output signal from the comparator 88 is supplied to the reset end of a flip-flop 102 and to the first input end of an AND gate 104 through a lock sensor 100. The output from the synchronous signal separator 90 is supplied to the first input end of an AND gate 106 through an inverter 105. The output end of the AND gate 106 is connected to the trigger end of the flip-flop 102. The Q output of the flip-flop 102 is supplied to the second input end of the AND gate 104, and the $\bar{Q}$ output therefrom is supplied to the second input end of the AND gate 106 through a delay line 108. When the reset end of the flip-flop 102 is set at logic level "0", the flip-flop 102 is reset. The delay time of the delay line 108 falls within a range of 1/30 to 2/30 sec. The output signal from the AND gate 104 is supplied to the control end of the analog switch 48.

The mode of operation of the video signal recording apparatus according to the first embodiment of the present invention will be described hereinafter. The recording apparatus has two operating modes: a first operating mode in which the audio signal is recorded on the magnetic disc 10 without modification; and a second operating mode in which the audio signal recorded in the first operating mode is reproduced and time-base compressed and the compressed audio signal and the video signal are recorded superposed on the same track. The audio signal is recorded first before the video signal is recorded. In the first operating mode, the switches 42, 80 and 94 are switched to the second, first and second stationary contacts thereof, respectively. The rotational speed of the DC motor 12 is set at 12 rpm by an output from the potentiometer 96. The level sensor 74 checks whether or not the output from the discriminator 70 has reached a negative voltage corresponding to 12 rpm. When the rotational frequency of the motor 12 reaches 12 rpm, the signal from the level sensor 74 is set to logic level "1". The timer 76 and the monostable multivibrator 78 are then turned on. The LED 62 and the bias circuit 56 are turned on for 5 seconds. Furthermore, the marker generator 60 is turned on for 1 ms. The LED 62 thus goes on and indicates the ready state for recording the audio signal. The audio signal can be recorded during the ON time of the LED 62. The frequency characteristics of the audio signal supplied to the audio signal input end 50 are corrected by the equalizer 52 and the corrected audio signal is supplied to the mixer 54. The marker generator 60 supplies a 10-kHz marker signal of 1 ms representing a recording start point to the mixer 54. The audio signals, the beginning portion of which is superposed with the marker signal, are recorded on the outermost track of the magnetic disc 10. Since the magnetic disc 10 is rotated at a speed of 12 rpm, the time required for one revolution is 5 seconds. The output from the bias circuit 56 is also supplied to the erasing circuit 58, so that an erasing voltage is supplied to the head 14. As a result, the audio signals previously recorded on the outermost track are erased before new audio signals are recorded.

Figure 4A:
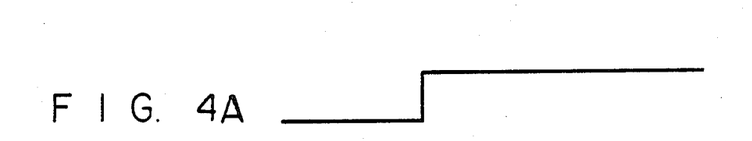
FIGS. 4A to 4C are timing charts for explaining the superposition recording of the video and audio signals.
Figure 4B:
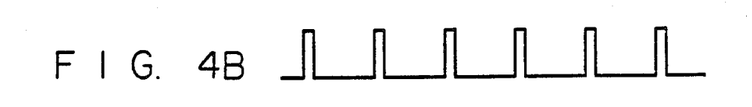
Figure 4C:
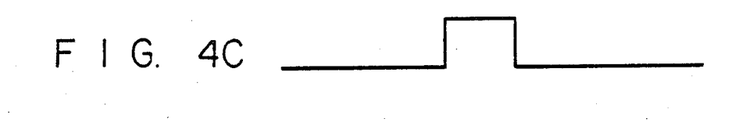
Figure 5:
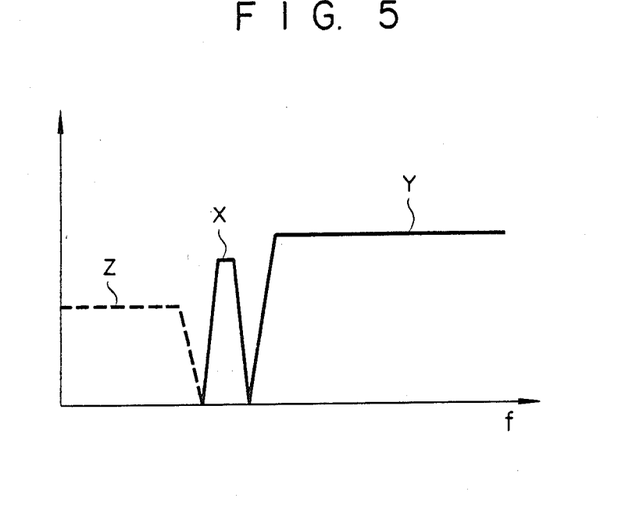
FIG. 5 is a graph showing the spectrum of the superposed signal.

The second operating mode will be described in which the video signal is superposed on the audio signal for recording. In this mode, the switches 42, 80 and 94 are switched to the first, second and first stationary contacts thereof, respectively, in a manner opposite to the switching states in the first operating mode. The frame synchronous signal is separated from the television signal supplied to the television signal input end 36 and is supplied to the sawtooth signal generator 92. A sawtooth signal having a period of 1/30 sec is produced from the sawtooth signal generator 92 and is supplied to the second input end of the comparator 88. When the magnetic disc 10 is rotated, the reproduced audio signal is produced from the head 16. Since the magnetic disc 10 is continuously rotated, the audio signals are repeatedly produced. The marker signal is separated from the reproduced audio signal which is produced by the head 16, and is supplied to the sampling pulse generator 86. Since the marker signal has a pulse width of 1 ms, the sampling pulse generator 86 produces a sampling pulse which has a pulse width slightly greater than that of the marker signal. The sampling pulse is then supplied to the first input end of the comparator 88. The comparator 88 compares the phases of the marker signal and the frame synchronous signal and produces a signal corresponding to a phase difference. This signal is then supplied to the mixer 72 through the switch 94. The DC motor 12 is thus rotated in synchronism with the frame synchronous signal. The rotational frequency of the DC motor 12 is increased to 30 rps. When the frame synchrous signal is synchronized with the marker signal, the output voltage of the comparator 88 becomes 0 V. In this condition, the output signal from the lock sensor 100 goes high (logic level "1") in accordance with phase locking. The reset state of the flip-flop 102 is released. Thereafter, the flip-flop 102 can then be set by the next frame synchronous signal. Phase locking can be performed while the magnetic disc 10 is rotated by two or three revolutions. When the flip-flop 102 is set, the analog switch 48 is turned on, so that the reproduced audio signal and the frequency-modulated video signal are superposed. A resultant composite signal is then supplied to the head 18. Since the delay time of the delay line 108 falls within a range of 1/30 to 2/30 sec, the output signal from the delay line 108 is kept at logic level "1" when the second frame synchronous signal is supplied. For this reason, the second frame synchronous signal is supplied to the flip-flop 102. Thereafter, the output from the delay line 108 goes low, so that the third and following frame synchronous signals may not be supplied to the flip-flop 102. After the output from the lock sensor 100 goes to logic level "1", the AND gate 104 produces a signal the logic level of which is kept at logic level "1" only during one frame period. The operation described above is described with reference to the timing charts in FIGS. 4A, 4B and 4C. FIG. 4A shows the output signal from the lock sensor 100; FIG. 4B shows the frame synchronous signal inverted by the inverter 105; and FIG. 4C shows the Q output signal from the flip-flop 102. The audio signals recorded for 5 seconds in the first operating mode are reproduced in a period of 1/30 sec. At the same time, the reproduced audio signal is superposed on the video signal corresponding to one frame. The composite signal is then recorded on one track of the magnetic disc 10. Since the marker signal is synchronized with the frame synchronous signal by the phase locked loop including the comparator 88, the leading edge of the audio signal is synchronized with that of a one-frame signal. The audio signal generally has a frequency band of about 10 kHz, but is time-base compressed to 1/150. The compressed audio signal is superposed on the video signal, so that the frequency band of the audio signal is 150 times the original frequency band thereof. As a result, the composite signal comprising the compressed audio signal and the video signal has a frequency of 1.5 MHz. FIG. 5 shows the frequency spectrum of the superposed signal comprising the audio signal and the video signal, where the superposed signal is produced by the mixer 40. Reference symbol X denotes a frequency spectrum of the compressed audio signal; Y, a frequency spectrum of the frequency-modulated luminance signal; and Z, a low-frequency converted chrominance signal when the video signal comprises a color signal and a chrominance signal separated therefrom is converted to a low frequency. In the manner described above, the video signals corresponding to one frame and the compressed audio signals are superposed, so that the superposed signal is then recorded on one track. When one-frame recording is completed, the stepping motor 22 is rotated, and the head 18 is radially moved toward the center of the disc 10 by a distance corresponding to one track width.

According to the video signal recording apparatus of the first embodiment described above, before the one-frame still image is recorded on one track of the magnetic disc 10, the audio signal is recorded on the magnetic disc 10 at a low speed and is then read out at a high speed. Thus, a special memory need not be used, and the audio signal can be time-base compressed. As a result, a convenient electronic camera can be obtained in which the frame image can be recorded together with the comment (audio signal) on the magnetic disc. Furthermore, the video and audio signals are superposed, so that the recording density of the magnetic disc is improved.

In the above embodiment, the track which is allocated for the time-base compression is the outermost track. However, any other predetermined track may also be used for this purpose. Furthermore, the compressed audio signal and the video signal can be recorded on different tracks, using respective audio and video signal recording heads. The rotational speeds of the disc in the first and second modes may be altered.

Figure 6:
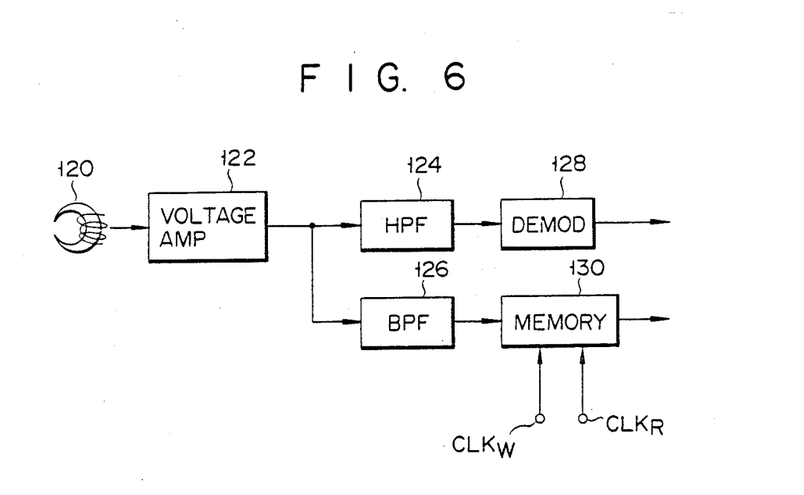
FIG. 6 is a block diagram of a reproduction apparatus for reproducing signals from the disc of the video signal recording apparatus shown in FIG. 1.

A reproduction apparatus for reproducing signals recorded by the video signal recording apparatus of the first embodiment of the present invention will be described hereinafter. FIG. 6 is a block diagram of the reproduction apparatus. The disc rotating mechanism of the reproduction apparatus is the same as that of the recording apparatus, and a detailed description thereof will be omitted. The rotating mechanism may be omitted from the reproduction apparatus. Instead, the recording apparatus may be built into the reproduction apparatus. In this case, the node between the current amplifier 46 and the analog switch 48 is connected to the reproduced signal output end. An output signal from a playback head 120 is supplied to a high-pass filter 124 and to a band-pass filter 126 through a voltage amplifier 122. The audio/video signal for one track is supplied to the high-pass filter 124 and the band-pass filter 126. The rotational frequency of the magnetic disc 10 is 30 rps in the playback mode. The recorded signal is reproduced from the portion at which the marker signal is recorded. The high-pass filter 124 passes a signal which is higher than 1.5 MHz. The signal passing through the high-pass filter 124 is converted by a frequency demodulator 128 to a video signal. An output from the frequency demodulator 128 is supplied to the CRT, the printer, and so on. The band-pass filter 126 passes a signal of about 1.5 MHz, thus obtaining the audio signal. The audio signal is then written in a memory 130. A write clock signal $CLK_W$ of 4.5 MHz and a read clock signal $CLK_R$ of 30 kHz are supplied to the memory 130. Since the frequency of the read clock signal $CLK_R$ is 1/150 times that of the write clock signal $CLK_W$, the compressed audio signal recorded on the magnetic disc 10 is time-base expanded. Thus, the original audio signal is read out from the memory 130 and is supplied to a speaker.

Figure 7:
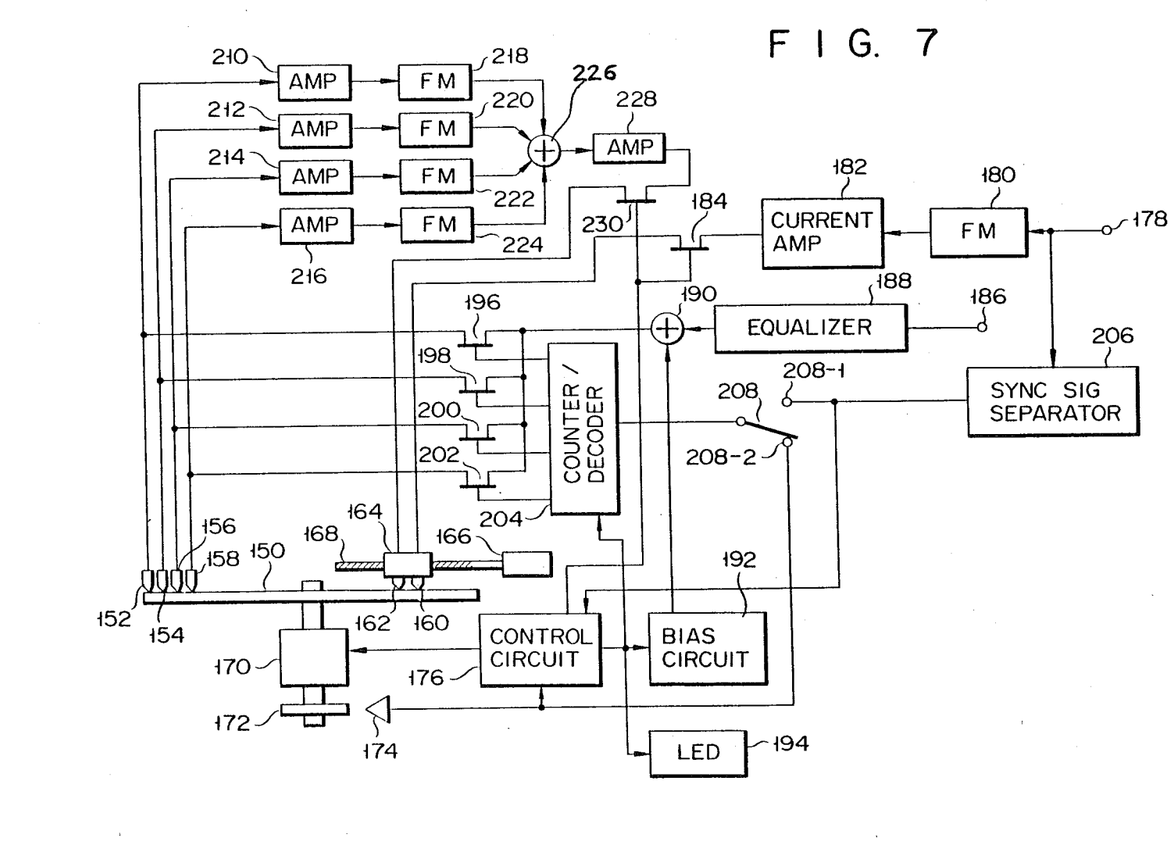
FIG. 7 is a block diagram of a video signal recording apparatus according to a second embodiment of the present invention.

A video signal recording apparatus according to a second embodiment of the present invention will now be described with reference to the block diagram of FIG. 7. In the first embodiment, the audio signal is recorded on the outermost track, the reproduced audio signal is superposed on the video signal, and the superposed signal is then recorded on the same track. For this reason, the audio signal is time-base compressed by a ratio of 1:150 which corresponds to the ratio of the angular velocities of the magnetic disc 10 in the recording mode and in the playback mode. However, in the second embodiment, the compression ratio of the recorded audio signal to the reproduced audio signal is set to be more than the angular velocity ratio. As shown in FIG. 7, according to the second embodiment, time-base compression is performed using the four outer tracks of the magnetic disc. Recording/playback heads 152, 154, 156 and 158 are respectively assigned to the four outer tracks so as to perform the audio signal compression. An erasing head (not shown) is also arranged in front of the four heads with respect to the rotational direction of the magnetic disc. A video signal recording head 160 and an audio signal recording head 162 are mounted on a holder 164 so as to respectively scan adjacent tracks. The holder 164 is screwed around a feed screw 168 which is rotated by a stepping motor 166. The holder 164 can be radially moved on a magnetic disc 150 in the same manner as in the first embodiment. The magnetic disc 150 is driven by a DC motor 170. A rotation phase detection encoder 172 is mounted on the rotating shaft of the motor 170. A phase sensor 174 is disposed in the vicinity of the encoder 172. An output pulse (one pulse per revolution) from the phase sensor 174 is supplied to a control circuit 176. The control circuit 176 has the same configuration as that of the first embodiment, and a detailed description thereof will be omitted. The DC motor 170 is controlled by the control circuit 176. A video signal input end 178 is connected to the video signal recording head 160 through a series circuit of a frequency modulator 180, a current amplifier 182 and an analog switch 184. An audio signal input end 186 is connected to the first input end of a mixer 190 through an equalizer 188. The control circuit 176 simultaneously controls a bias circuit 192 and an LED 194. An output from the bias circuit 192 is supplied to the second input end of the mixer 190. An output from the mixer 190 is supplied to the heads 152, 154, 156 and 158 respectively through analog switches 196, 198, 200 and 202. The ON/OFF operation of the analog switches 196, 198, 200 and 202 is controlled by a 2-bit counter/decoder 204. The video signal is supplied to a frame synchronous signal separator 206 which then supplies an output to a first stationary contact 208-1 of a switch 208 and to the control circuit 176. An output from the phase sensor 174 is supplied to a second stationary contact 208-2 of the switch 208. The movable contact of the switch 208 is connected to the clock input end of the counter/decoder 204. Reproduced outputs from the heads 152, 154, 156 and 158 are supplied to voltage amplifiers 210, 212, 214 and 216, respectively. Outputs from the voltage amplifiers 210, 212, 214 and 216 are supplied to a mixer 226 through frequency modulators 218, 220, 222 and 224, respectively. An output from the mixer 226 is supplied to the head 162 through a current amplifier 228 and an analog switch 230. The analog switches 184 and 230 are simultaneously turned on/off by the control circuit 176.

The mode of operation of the video signal recording apparatus according to the second embodiment of the present invention will now be described. In the first operating mode in which only the audio signal is recorded, the switch 208 is switched such that the movable contact thereof is connected to the second stationary contact 208-2 thereof. The counter/decoder is in the reset status. The DC motor 170 is driven by the control circuit 176 at a low speed of 12 rpm. Assume that the video signal is supplied to the video signal input end 178 also in the first operating mode. The rotational frequency of the DC motor 170 is controlled such that the phase of the output pulse from the phase sensor 174 is synchronized with that of the frame synchronous signal. The frame synchronous signal has a period of 1/30 sec. If this frame synchronous signal per se is synchronized with the output pulse from the phase sensor 174, the rotational speed of the motor is 30 rps. However, in the first operating mode, the rotational speed is decreased to 1/150, thus obtaining a low speed of 12 rpm. When the rotational speed of the DC motor 170 is set at the speed of 12 rpm, the control circuit 176 is operated to turn on the bias circuit 192 and the LED 194 for 20 seconds. At the same time, the control circuit 176 causes the release of the reset status of the counter/decoder 204. The ON state of the LED 194 indicates that the audio signal can be recorded. The counter decoder 204 sequentially turns on the analog switches 196, 198, 200 and 202 each time the rotating shaft of the DC motor 170 is rotated by one revolution. When the counter/decoder 204 fully counts the pulses, it is then reset again. In other words, for each 5 second duration of one revolution of the magnetic disc 150, the audio signals are recorded on a different one of the four outer tracks in turn. Therefore, the audio signals are recorded on the four outer tracks for a total of 20 seconds.

In the second operating mode, the switch 208 is switched such that its movable contact is connected to the first stationary contact 208-1. At the same time, the control circuit 176 causes the rotational speed of the DC motor 170 to increase to 30 rps. The audio signals time-base compressed to 1/150 are reproduced by the heads 152, 154, 156 and 158, respectively. These signals are then supplied to the mixer 226 through the frequency modulators 218, 220, 222 and 224, respectively. The center frequencies of the frequency modulators 218, 220, 222 and 224 are set to be 3, 4, 5 and 6 MHz, respectively. The output signals from the frequency modulators 218, 220, 222 and 224 are superposed by the mixer 226 on each other, thus obtaining one multiplex signal. When the rotational speed of the DC motor 170 is properly synchronized in accordance with the frame synchronous signal, the analog switches 184 and 230 are turned on by the control circuit 176 for a one-frame period (1/30 sec). The frequency-modulated video signals corresponding to one frame are recorded by the head 160 on one track of the magnetic disc 150. At the same time, the frequency multiplex signal from the mixer 226 is recorded by the head 162 on a track adjacent to the video track. Thus, the reproduced signals from the four outer tracks are superposed and recorded again on one track, so that the time base compression ratio is 1/600 (1/150×¼). When recording for one frame is completed, the stepping motor 166 is rotated, and the heads 160 and 162 are radially moved toward the center of the magnetic disc by a distance corresponding to two tracks.

According to the second embodiment of the present invention, the audio signals are recorded on four outer tracks of the magnetic disc 150 while the magnetic disc 150 is rotated at a low speed. The audio signals are then read out from the tracks by parallel processing while the magnetic disc 150 is rotated at a high speed so as to record the one-frame video signals. The audio signals are then superposed, and are then recorded on one audio track. In this manner, the ratio of the signal compression can be made higher than the ratio of the rotational speed of the magnetic disc in the first operating mode to that in the second operating mode. As a result, more audio information can be recorded together with the pictures taken by the electronic camera. The number of recording tracks for audio signal compression is not limited to four tracks. The compressed audio signal may be superposed on the video signal in the same manner as in the first embodiment. The rotational frequencies of the magnetic disc in the first and second operating modes may not be limited to those described in the above embodiments.

Figure 8:
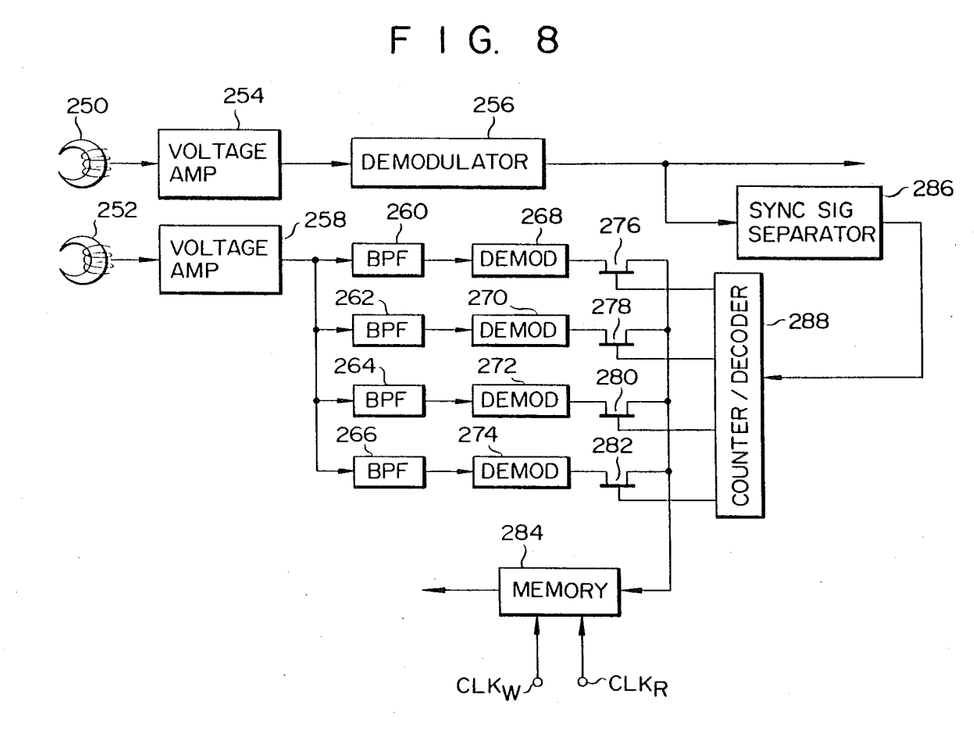
FIG. 8 is a block diagram of a reproduction apparatus for reproducing signals from the disc of the video signal recording apparatus shown in FIG. 7.

A reproduction apparatus using the video signal recording apparatus of the second embodiment will be described with reference to FIG. 8. The reproduction apparatus has a video signal playback head 250 and an audio signal playback head 252. In the same manner as in the first embodiment, the disc rotating mechanism of the recording apparatus may also serve as that of the reproduction apparatus. An output signal from the head 250 is supplied as a video signal to the printer, the CRT and so on through a voltage amplifier 254 and a frequency demodulator 256. An output from the head 252 is supplied to band-pass filters 260, 262, 264 and 266 through the voltage amplifier 258. The band-pass filters 260, 262, 264 and 266 pass signals having frequency bands of about 3, 4, 5 and 6 MHz, respectively. Outputs from the band-pass filters 260, 262, 264 and 266 are demodulated by frequency demodulators 268, 270, 272 and 274, respectively. Outputs from the frequency demodulators 268, 270, 272 and 274 are supplied to a memory 284 through analog switches 276, 278, 280 and 282, respectively. An output from the frequency demodulator 256 is also supplied to the clock input end of a 2-bit counter/decoder 288 through a frame synchronous signal separator 286. An output from the counter/decoder 288 is supplied to the gates of the analog switches 276, 278, 280 and 282. A write clock signal $CLK_W$ of 4.5 MHz and a read clock signal $CLK_R$ of 30 kHz are supplied to the memory 284. Data read out from the memory 284 is supplied to a speaker (not shown).

The mode of operation of the reproduction apparatus will be described. The magnetic disc is determined to be rotated at a speed of 30 rpm. When the rotational speed of the magnetic disc reaches 30 rpm, the heads 250 and 252 are brought into contact with the magnetic disc. The video signals corresponding to one frame are reproduced through the voltage amplifier 254 and the frequency demodulator 256. In this operation, the frame synchronous signal is separated from the frame signal and is supplied to the counter/decoder 288. The counter/decoder 288 sequentially turns on the analog switches 276, 278, 280 and 282. The counter/decoder 288 is then reset by the 5th frame synchronous signal and simultaneously turns off all the analog switches. The frequency multiplex signal reproduced by the head 252 is separated by the band-pass filters 260, 262, 264 and 266 into signals having frequency bands of 3, 4, 5 and 6 MHz, respectively. These signals are then demodulated and are written in the memory 284 in the order of the outputs from the band-pass filters 260, 262, 264 and 266 while the magnetic disc is rotated four times. This order is the same as that in the first operating mode. In accordance with the frequency division described above, the audio signal is expanded to have a frequency of four times that of the compressed signal, thus obtaining a signal having a frequency of 1/150 (4/600) of that of the original signal. The frequency of the read clock signal for the memory 284 is 150 times that of the write clock signal, so that the memory 284 performs time-base expansion using 150 as a multiplier. In this manner, the signal read out from the memory 284 is demodulated to the original signal.

In summary, according to the present invention, the audio signal is time-base compressed without using a special memory means and can be recorded together with the still video signal on a disc-shaped recording medium. Therefore, a video signal recording apparatus can be obtained in which the recording medium can be effectively used. According to the present invention, in the disc-shaped recording medium only the audio signal is time-base compressed. Therefore, various changes and modifications may be made within the spirit and scope of the present invention. For example, a magnetic recording method is utilized in the above embodiments, but the invention is not limited to a recording method of this type. An optical recording method which allows erasure can also be used.

What is claimed is:

1. A video signal recording apparatus for recording a video signal of a still image and a time-base compressed audio signal relating to the still image on a disc-shaped recording medium with a plurality of concentric tracks, which comprises:

means for rotating the recording medium at a first speed during a first period and a second speed faster than the first speed during a second period, the ratio of the first speed to the second speed corresponding to a ratio of a time-base compression of the audio signal;

first recording means for recording an audio signal on a first track of the recording medium during the first period; and second recording means for reproducing the recorded audio signal from the first track, and for recording the reproduced audio signal together with a video signal of a still image on a second track of the recording medium other than the first track, during the second period.

2. An apparatus according to claim 1, wherein said first recording means records the audio signal on the first track which comprises a single first track, and said second recording means records the reproduced audio signal and the video signal on the second track which comprises a single second track.

3. An apparatus according to claim 2, wherein
said rotating means includes a motor for rotating the recording medium and a phase locked loop circuit for selectively setting a rotational speed of said motor at the first and second speeds in accordance with a frame synchronous signal of the video signal;
said first recording means includes a bias circuit which is operated for a first predetermined time interval corresponding to the first speed when the recording medium is driven at the first speed, and a recording/playback head for recording the audio signal on the first track of the recording medium in response to an output from said bias circuit; and
said second recording means includes a mixer for mixing an output from said recording/playback head and the video signal, an analog switch which is operated for a second predetermined time interval corresponding to the second speed, and a recording head connected to an output end of said mixer through said analog switch.

4. An apparatus according to claim 3, wherein said first recording means comprises a marker generator for generating a marker signal to be superposed with an audio signal on the first track when recording of the audio signal is started, and said rotating means synchronizes a phase of the marker signal with a phase of a frame synchronous signal.

5. An apparatus according to claim 1, wherein said first recording means records the audio signal on the first track which comprises a plurality of first tracks, and said second recording means respectively records a multiplex audio signal and a video signal on the second track which comprises two second tracks, the multiplex audio signal being obtained by frequency modulating the reproduced audio signals so as to respectively have different center frequencies and to be superposed on each other.

6. An apparatus according to claim 5, wherein
said first recording means includes a plurality of recording/playback heads respectively arranged on the plurality of first tracks of the recording medium, and a switch circuit for sequentially supplying the audio signal to said plurality of recording/playback heads in turn each time said recording medium is rotated by one revolution; and
said second recording means includes a first video signal recording head for recording the video signal on one of the of second tracks, a plurality of modulators of different center frequencies for modulating the reproduced audio signals respectively reproduced from said plurality of recording/playback heads, a mixer for mixing outputs from the plurality of modulators, and a second recording head for recording an output from said mixer on a track adjacent to the second tracks on which the video signal is recorded.

* * * * *